United States Patent
McDaniel

(10) Patent No.: US 9,637,673 B2
(45) Date of Patent: May 2, 2017

(54) PHOSPHO-FRICTION REDUCING AGENTS FOR USE IN OLEAGINOUS-BASED DRILLING FLUIDS

(71) Applicant: Halliburton Energy Services, Inc., Houston, TX (US)

(72) Inventor: Cato Russell McDaniel, Montgomery, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/362,528

(22) PCT Filed: Jul. 31, 2013

(86) PCT No.: PCT/US2013/052905
§ 371 (c)(1),
(2) Date: Jun. 3, 2014

(87) PCT Pub. No.: WO2015/016874
PCT Pub. Date: Feb. 5, 2015

(65) Prior Publication Data
US 2015/0232735 A1    Aug. 20, 2015

(51) Int. Cl.
*C09K 8/32* (2006.01)
*E21B 7/00* (2006.01)
*E21B 21/01* (2006.01)

(52) U.S. Cl.
CPC ............ *C09K 8/32* (2013.01); *E21B 7/00* (2013.01); *E21B 21/01* (2013.01); *C09K 2208/28* (2013.01)

(58) Field of Classification Search
CPC ...... C09K 2208/28; C09K 8/34; C09K 8/528; C09K 8/68; C09K 8/72; E21B 43/26; E21B 37/06; E21B 43/16; E21B 21/01; E21B 7/00

USPC .......................................................... 175/65
See application file for complete search history.

(56) References Cited

U.S. PATENT DOCUMENTS

| | | | |
|---|---|---|---|
| 4,572,790 A | 2/1986 | Headley | |
| 5,572,790 A | 11/1996 | Sekar | |
| 5,866,517 A | 2/1999 | Carpenter et al. | |
| 5,874,387 A | 2/1999 | Carpenter et al. | |

(Continued)

FOREIGN PATENT DOCUMENTS

| | | | |
|---|---|---|---|
| RU | 2574659 C1 * | 2/2016 | ............... C09K 8/03 |
| WO | 2015016874 A1 | 2/2015 | |

OTHER PUBLICATIONS

Chang et al., "The Use of Zinc Dialkyl Dithiophosphate as a Lubricant Enhancer for Drilling Fluids Particularly Silicate-Based Drilling Fluids," SPE 141327, 2011.

(Continued)

*Primary Examiner* — Zakiya W Bates
(74) *Attorney, Agent, or Firm* — McDermott Will & Emery LLP

(57) ABSTRACT

Phospho-friction reducing agents may include phosphonates, thiophosphonates, and derivatives thereof. The phospho-friction reducing agents may be included in drilling fluids with oleaginous base fluids and used in methods that involve drilling a wellbore penetrating a subterranean formation. Further, the phospho-friction reducing agents may be useful at relatively low concentrations in the drilling fluids (e.g., about 0.001 v/v % to about 0.5 v/v % of the drilling fluid).

16 Claims, 1 Drawing Sheet

(56) References Cited

U.S. PATENT DOCUMENTS

| | | |
|---|---|---|
| 7,081,438 B2 | 7/2006 | Horton |
| 7,188,676 B2 | 3/2007 | Qu et al. |
| 8,067,343 B2 | 11/2011 | Horton et al. |
| 2005/0037927 A1* | 2/2005 | Horton ............... C09K 8/22 507/100 |
| 2005/0139356 A1* | 6/2005 | Prukop ............... C09K 8/52 166/300 |
| 2007/0125987 A1* | 6/2007 | Hills ............... C02F 5/12 252/408.1 |
| 2009/0114247 A1* | 5/2009 | Brown ............... E21B 37/06 134/3 |
| 2010/0000795 A1* | 1/2010 | Kakadjian ............... C09K 8/38 175/69 |
| 2011/0237470 A1 | 9/2011 | Li et al. |
| 2013/0168096 A1* | 7/2013 | Parkhonyuk ............... C09K 8/62 166/305.1 |

OTHER PUBLICATIONS

International Search Report and Written Opinion for PCT/US2013/052905 dated Apr. 28, 2014.

* cited by examiner

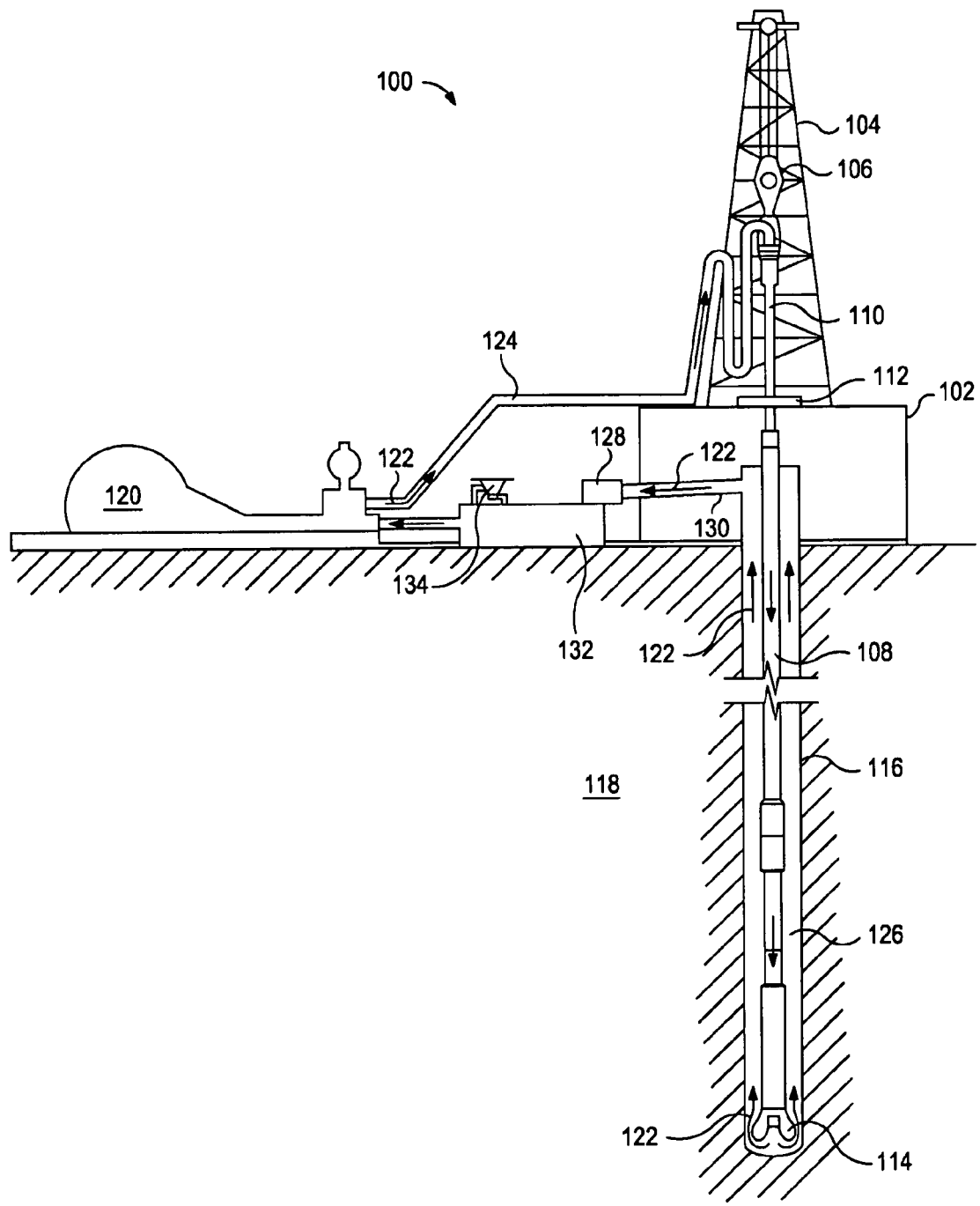

PHOSPHO-FRICTION REDUCING AGENTS FOR USE IN OLEAGINOUS-BASED DRILLING FLUIDS

BACKGROUND

At least some of the exemplary embodiments described herein relate to phospho-friction reducing agents in oleaginous-based drilling fluids, including methods relating thereto.

During the drilling, completion, and stimulation of wellbores and subterranean formations, treatment fluids are often pumped through tubular goods (e.g., pipes, coiled tubing, etc.). A considerable amount of energy may be lost due to friction between the treatment fluid in turbulent flow and the formation, the wellbore, and/or the tubular goods located within the wellbore. As a result of these energy losses, additional horsepower may be necessary to achieve the desired treatment. Additional horsepower increases energy consumption costs and can cause operators to introduce treatment fluids at a slower rate, which, in turn, increases the time and cost of a wellbore operation. To reduce these energy losses and associated costs, friction reducing agents are typically added to the treatment fluid.

Relative to drilling operations, a plurality of friction reducing agents for use in conjunction with aqueous-based drilling fluids have been developed. Typically, these friction reducing agents are polymeric compounds. However, friction reducing agents for use in conjunction with oleaginous-based drilling fluids, which are more often used than aqueous-based drilling fluids, are under developed and tend to encompass larger compounds like fatty acid esters, which are at relatively high concentrations to effectively reduce friction in the oleaginous-based drilling fluid. Under development in this area can be attributed to the assumption in the field has been that oleaginous-based drilling fluids have low enough coefficients of friction (e.g., 0.10 or less) that friction reducing agents would have little to no effect. However, at higher temperatures and pressures (e.g., as experienced in wellbore drilling), the coefficient of friction can increase significantly for oleaginous-based drilling fluids, which can be magnified with the use of additives like weighting agents, corrosion inhibitors, and the like. Therefore, a need exists for friction reducing agents that are effective in oleaginous-based drilling fluids, especially at lower concentrations.

BRIEF DESCRIPTION OF THE DRAWINGS

The following FIGURES are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 illustrates a system for drilling a wellbore according to at least one embodiment described herein.

DETAILED DESCRIPTION

At least some of the exemplary embodiments described herein relate to phospho-friction reducing agents in oleaginous-based drilling fluids, including methods relating thereto.

As used herein, the term "phospho-friction reducing agent" refers to a phosphonate, a thiophosphonate, derivative thereof, or combination thereof according to Formula I, wherein $R_1$ is selected from hydrogen, $C_1$-$C_{20}$ alkyl, aryl, $C_6$-$C_{20}$ alkylaryl, $C_6$-$C_{20}$ arylalkyl, polybutene, polypropylene, polyethylene, pentaerthritol, trimethylolpropane, esters of pentaerthritol, esters of trimethylolpropane, partial esters of pentaerthritol, partial esters of trimethylolpropane, phosphonic, phosphonate, phosphate, aminophosphonic acid, aminophosphonate, acyl, amine, hydroxy, or carboxyl groups, $R_2$ and $R_3$ are independently selected from hydrogen, $C_1$-$C_{20}$ alkyl, aryl, $C_6$-$C_{20}$ alkylaryl, $C_6$-$C_{20}$ arylalkyl, polybutene, polypropylene, polyethylene, pentaerthritol, trimethylolpropane, esters of pentaerthritol, esters of trimethylolpropane, partial esters of pentaerthritol, partial esters of trimethylolpropane, phosphonic, phosphonate, phosphate, aminophosphonic acid, aminophosphonate, acyl, amine, hydroxy, carboxyl groups, sodium, potassium, ammonium, or an organic radical, and X is oxygen (e.g., a phosphonate or derivative thereof) or sulfur (e.g., a thiophosphonate or derivative thereof).

Formula I

Partial esters and esters of pentaerthritol may be according to Formula II, wherein $R_1$, $R_2$, and $R_3$ are selected from hydrogen, $C_1$-$C_{20}$ alkyl, aryl, $C_6$-$C_{20}$ alkylaryl, $C_6$-$C_{20}$ arylalkyl, polybutene, polypropylene, and polyethylene.

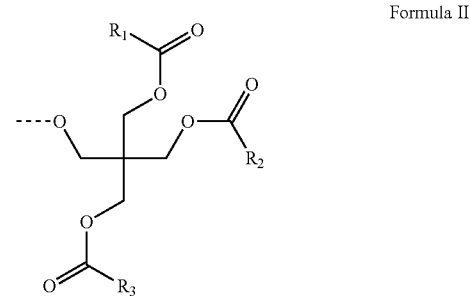

Formula II

Partial esters and esters of trimethylolpropane may be according to Formula III, wherein $R_1$ and $R_2$ are selected from hydrogen, $C_1$-$C_{20}$ alkyl, aryl, $C_6$-$C_{20}$ alkylaryl, $C_6$-$C_{20}$ arylalkyl, polybutene, polypropylene, and polyethylene.

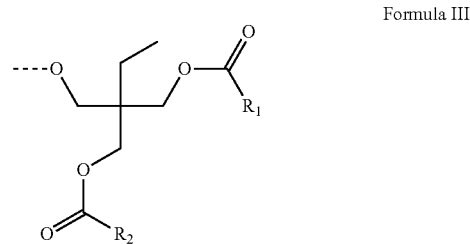

Formula III

The phospho-friction reducing agents described herein may reduce the coefficient of friction of oleaginous-based drilling fluids at relatively low concentrations (e.g., about 0.5 v/v % of the drilling fluid and less). As such, the corresponding drilling operations may advantageously be performed at higher rates of penetration with less energy consumption relative to pumping or circulating the drilling fluid. Higher rates of penetration decrease drilling time and the associated costs, which can be quite substantial, especially in off-shore situations where rig time is upwards of about $1 million per day.

While compositions and methods are described in terms of "comprising" various components or steps, the compositions and methods can also "consist essentially of" or "consist of" the various components and steps. When "comprising" is used in a claim, it is open-ended.

It should be noted that when "about" is provided herein at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claim, each numerical parameter should at least be construed in light of the number of reported significant digits and by applying ordinary rounding techniques.

In some exemplary embodiments, the drilling fluids described herein comprise an oleaginous base fluid and a phospho-friction reducing agent.

Suitable phospho-friction reducing agents may be according to Formula I above. Examples of phospho-friction reducing agents suitable for use as friction reducing agents may include, but are not limited to, amino trimethylene phosphonic acid; bis(hexa methylene triamine penta(methylene phosphonic acid); diethylene triamine penta(methylene phosphonic acid); ethylene diamine tetra(methylene phosphonic acid); hexamethylenediamine tetra(methylene phosphonic acid); 1-hydroxy ethylidene-1,1-diphosphonic acid; hexa methylene diamine tetra(methylene phosphonic acid); 2-hydroxyphosphonocarboxylic acid; 2-phosphonobutane-1,2,4-tricarboxylic acid; methylene diphosphonic acid, trimethyiphosphate; dimethyl thiophosphonate; a phosphonate or thiophosphonate with at least one R group being: polybutene, polypropylene, polyethylene, pentaerthritol, trimethylolpropane, esters of pentaerthritol, esters of trimethylolpropane, partial esters of pentaerthritol, or partial esters of trimethylolpropane; derivatives thereof, salts thereof (e.g., sodium, potassium, ammonium, or organic radical salts), and any combination thereof.

In some embodiments, the phospho-friction reducing agents may be included in the drilling fluid in an amount ranging from a lower limit of about 0.001 v/v %, 0.0025 v/v %, 0.005 v/v %, 0.01 v/v %, 0.05 v/v %, or 0.1 v/v % of the drilling fluid to an upper limit of about 0.5 v/v %, 0.25 v/v %, 0.15 v/v %, or 0.1 v/v % of the drilling fluid to the drilling fluid, and wherein the concentration may range from any lower limit to any upper limit and encompasses any subset therebetween.

Suitable oleaginous base fluids for use in conjunction with the methods described herein may include, but not be limited to, an alkane, an olefin, an aromatic organic compound, a cyclic alkane, a paraffin, a diesel fluid, a mineral oil, a desulfurized hydrogenated kerosene, and the like, and any combination thereof. In some embodiments, the oleaginous base fluid may be an emulsion with an oleaginous continuous phase selected from the oleaginous base fluids described herein.

In some instances, the drilling fluids described herein may further comprise a traditional friction reducing agent. It should be noted that the term "traditional friction reducing agent" is used for clarity in differentiating over the phospho-friction reducing agents and does not imply a particular number of friction reducing agents in the drilling fluid. For example, in some embodiments, drilling fluids may comprise one or more phospho-friction reducing agents and one or more traditional friction reducing agents.

Suitable traditional friction reducing agents may include, but are not limited to, $C_2$-$C_{12}$ alcohols, natural oils (e.g., animal fats and vegetable fats), $C_8$-$C_{24}$ fatty acid esters of $C_2$-$C_{12}$ polyhydroxylated compounds, and the like. Examples of polyhydroxylated compounds may include, but are not limited to, ethylene glycol, glycerol, polyethylene glycol, butane diol, trimethylene glycol, tetramethylene glycol, amyl diol, or pentane diol. The fatty acid ester derivatives thereof may be mono, di, tri, and so on, where some or all of the hydroxyls of the polyhydroxylated compound may be esterified. Examples of $C_8$-$C_{24}$ fatty acids suitable for esterifying polyhydroxylated compounds may include, but are not limited to, lauric acid, palmitic acid, oleic acid, linoleic acid, steric acid, capric, caprillic, stearic, erucic, linoleic, linolenic, ricinoleic, and any combination thereof.

In some embodiments, the traditional friction reducing agents may be included in the drilling fluid in an amount ranging from a lower limit of about 0.01 v/v %, 0.05 v/v %, 0.1 v/v %, or 0.5 v/v % of the drilling fluid to an upper limit of about 5 v/v %, 2.5 v/v %, 1 v/v %, or 0.5 v/v % of the drilling fluid to the drilling fluid, and wherein the concentration may range from any lower limit to any upper limit and encompasses any subset therebetween.

In some embodiments, the drilling fluids described herein may optionally further comprise additives. Suitable additives may include, but are not limited to, weighting agents, inert solids, fluid loss control agents, emulsifiers, dispersion aids, corrosion inhibitors, emulsion thinners, emulsion thickeners, surfactants, lost circulation materials, pH control additives, breakers, biocides, crosslinkers, stabilizers, chelating agents, scale inhibitors, gas hydrate inhibitors, mutual solvents, oxidizers, reducers, clay stabilizing agents, and the like, and any combination thereof. One of ordinary skill in the art should understand which additives and at what concentration should be included in the drilling fluid for use in a desired method. By way of nonlimiting example, weighting agents may be included in the drilling fluids described herein to adjust the density or weight of a drilling fluid.

Some embodiments may involve drilling at least a portion of a wellbore penetrating a subterranean formation while circulating in the wellbore a drilling fluid described herein (e.g., a drilling fluid comprising an oleaginous base fluid and a phospho-friction reducing agent and optionally further comprising at least one of a traditional friction reducing agent, an additive described herein, or a combination thereof).

In some instances, the phospho-friction reducing agent may decompose at temperatures of about 400° F. or greater, which is higher than many traditional friction reducing agents, some of which decompose at temperatures as low as about 200° F. In some embodiments, the wellbore may have a bottom hole circulating temperature ranging from a lower limit of about 100° F., 200° F., 225° F., or 250° F. to an upper limit of about 400° F., 350° F., or 300° F., and wherein the bottom hole circulating temperature may range from any lower limit to any upper limit and encompasses any subset therebetween.

The exemplary phospho-friction reducing agents disclosed herein may directly or indirectly affect one or more components or pieces of equipment associated with the preparation, delivery, recapture, recycling, reuse, and/or disposal of the disclosed phospho-friction reducing agents. For example, and with reference to FIG. 1, the disclosed phospho-friction reducing agents and corresponding drilling fluids may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed phospho-friction reducing agents may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed phospho-friction reducing agents may be added to the drilling fluid 122 at any other location in the drilling assembly 100. In at least one embodiment, for example, there could be more than one retention pit 132, such as multiple retention pits 132 in series. Moreover, the retention put 132 may be representative of one or more fluid storage facilities and/or units where the disclosed phospho-friction reducing agents may be stored, reconditioned, and/or regulated until added to the drilling fluid 122.

As mentioned above, the disclosed phospho-friction reducing agents may directly or indirectly affect the components and equipment of the drilling assembly 100. For example, the disclosed phospho-friction reducing agents may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, The fluid processing unit(s) 128 may further include one or more sensors, gauges, pumps, compressors, and the like used to store, monitor, regulate, and/or recondition the exemplary phospho-friction reducing agents.

The disclosed phospho-friction reducing agents may directly or indirectly affect the pump 120, which representatively includes any conduits, pipelines, trucks, tubulars, and/or pipes used to fluidically convey the phospho-friction reducing agents downhole, any pumps, compressors, or motors (e.g., topside or downhole) used to drive the phospho-friction reducing agents into motion, any valves or related joints used to regulate the pressure or flow rate of the phospho-friction reducing agents, and any sensors (i.e., pressure, temperature, flow rate, etc.), gauges, and/or combinations thereof, and the like. The disclosed phospho-friction reducing agents may also directly or indirectly affect the mixing hopper 134 and the retention pit 132 and their assorted variations.

The disclosed phospho-friction reducing agents may also directly or indirectly affect the various downhole equipment and tools that may come into contact with the phospho-friction reducing agents such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed phospho-friction reducing agents may also directly or indirectly affect any downhole heat exchangers, valves and corresponding actuation devices, tool seals, packers and other wellbore isolation devices or components, and the like associated with the wellbore 116. The disclosed phospho-friction reducing agents may also directly or indirectly affect the drill bit 114, which may include, but is not limited to, roller cone bits, PDC bits, natural diamond bits, any hole openers, reamers, coring bits, etc.

While not specifically illustrated herein, the disclosed phospho-friction reducing agents may also directly or indirectly affect any transport or delivery equipment used to convey the drilling fluids comprising phospho-friction reducing agents described herein to the drilling assembly 100 such as, for example, any transport vessels, conduits, pipelines, trucks, tubulars, and/or pipes used to fluidically move the drilling fluids comprising phospho-friction reducing agents described herein from one location to another, any pumps, compressors, or motors used to drive the phospho-friction reducing agents into motion, any valves or related joints used to regulate the pressure or flow rate of the drilling fluids comprising phospho-friction reducing agents described herein, and any sensors (i.e., pressure and temperature), gauges, and/or combinations thereof, and the like.

Embodiments disclosed herein include:

A. a method that includes drilling at least a portion of a wellbore penetrating a subterranean formation while circulating in the wellbore a drilling fluid comprising an oleaginous base fluid and a phospho-friction reducing agent, wherein the phospho-friction reducing agent comprises at least one compound according to Formula I;

B. a method that includes drilling at least a portion of a wellbore penetrating a subterranean formation while circulating in the wellbore a drilling fluid comprising an oleaginous base fluid and a phospho-friction reducing agent at about 0.001 v/v % to about 0.5 v/v % of the drilling fluid, wherein the phospho-friction reducing agent comprises at least one compound according to Formula I, wherein the wellbore has a bottom hole circulating temperature of about 225° F. to about 400° F.; and C. a method that includes drilling at least a portion of a wellbore penetrating a subterranean formation while circulating in the wellbore a drilling fluid comprising an oleaginous base fluid, a phospho-friction reducing agent, and a traditional friction reducing agent, wherein the phospho-friction reducing agent is present in an amount of 0.001 v/v % to about 0.5 v/v % of the drilling fluid and comprises at least one compound according to Formula I, and wherein the traditional friction reducing agent comprises at least one selected from the group consisting of a $C_2$-$C_{12}$ alcohol, a natural oil, a $C_8$-$C_{24}$ fatty acid ester of a $C_2$-$C_{12}$ polyhydroxylated compound, and any combination thereof and is present in an amount of 0.01 v/v % to about 5 v/v % of the drilling fluid.

Each of embodiments A, B, and C may have one or more of the following additional elements, unless already provided for, in any combination: Element 1: the phospho-friction reducing agent being present in an amount of 0.001 v/v % to about 0.5 v/v % of the drilling fluid; Element 2: the drilling fluid further comprising a traditional friction reducing agent; Element 3: the drilling fluid further comprising a traditional friction reducing agent that comprises at least one selected from the group consisting of a $C_2$-$C_{12}$ alcohol, a natural oil, a $C_8$-$C_{24}$ fatty acid ester of a $C_2$-$C_{12}$ polyhydroxylated compound, and any combination thereof; Element 4: the drilling fluid further comprising a traditional friction reducing agent in an amount of 0.01 v/v % to about 5 v/v % of the drilling fluid; Element 5: the wellbore having a bottom hole circulating temperature of about 225° F. to about 400° F.; Element 6: the oleaginous fluid comprise at least one selected from the group consisting of an alkane, an olefin, an aromatic organic compound, a cyclic alkane, a paraffin, a diesel fluid, a mineral oil, a desulfurized hydrogenated kerosene, and the like, and any combination thereof; Element 7: the drilling fluid being an emulsion with the oleaginous fluid as a continuous phase; Element 8: phospho-friction reducing agent being at least one selected from the group consisting of amino trimethylene phosphonic acid; bis(hexa methylene triamine penta(methylene phosphonic acid); diethylene triamine penta(methylene phosphonic acid); ethylene diamine tetra(methylene phosphonic acid); hexamethylenediamine tetra(methylene phosphonic acid); 1-hydroxy ethylidene-1,1-diphosphonic acid; hexa methylene diamine tetra(methylene phosphonic acid); 2-hydroxyphosphonocarboxylic acid; 2-phosphonobutane-1,2,4-tricarboxylic acid; methylene diphosphonic acid, trimethylphosphate; dimethyl thiophosphonate; a phosphonate or thiophosphonate with at least one R group being: polybutene, polypropylene, polyethylene, pentaerthritol, trimethylolpropane, esters of pentaerthritol, esters of trimethylolpropane, partial esters of pentaerthritol, or partial esters of trimethylolpropane; derivatives thereof, salts thereof (e.g., sodium, potassium, ammonium, or organic radical salts), and any combination thereof; and Element 9: the drilling fluid may further comprise additives selected from the group consisting of weighting agents, inert solids, fluid loss control agents, emulsifiers, dispersion aids, corrosion inhibitors, emulsion thinners, emulsion thickeners, surfactants, lost circulation materials, pH control additives, breakers, biocides, crosslinkers, stabilizers, chelating agents, scale inhibitors, gas hydrate inhibitors, mutual solvents, oxidizers, reducers, clay stabilizing agents, and any combination thereof.

By way of non-limiting example, exemplary combinations applicable to A, B, C include: Element 1 in combination with Element 5; Element 1 in combination with Element 5 and at least one of Elements 2-4; Element 1 in combination with at least one of Elements 2-4; Element 5 in combination with at least one of Elements 2-4; Element 6 in combination with any of the foregoing; Element 7 in combination with any of the foregoing; Element 8 in combination with any of the foregoing; Element 9 in combination with any of the foregoing; and so on.

Some embodiments may be a drilling system or assembly that comprises a drilling platform operably coupled to a drill string; a drill bit attached to the distal end of the drill string; a drilling fluid comprising an oleaginous base fluid and a phospho-friction reducing agent contained within the drill string, wherein the phospho-friction reducing agent comprises at least one compound according to Formula I; and a pump operably connected to the drill string for pumping the drilling fluid through the drill string. In some embodiments, the drilling fluid of the drilling system may optionally include at least one of Elements 1-4 or 6-9 above.

One or more illustrative embodiments incorporating the exemplary embodiments disclosed herein are presented herein. Not all features of an actual implementation are described or shown in this application for the sake of clarity. It is understood that in the development of an actual embodiment incorporating the present invention, numerous implementation-specific decisions must be made to achieve the developer's goals, such as compliance with system-related, business-related, government-related and other constraints, which vary by implementation and from time to time. While a developer's efforts might be complex and time-consuming, such efforts would be, nevertheless, a routine undertaking for those of ordinary skill the art having benefit of this disclosure.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   drilling at least a portion of a wellbore penetrating a subterranean formation while circulating in the wellbore a drilling fluid comprising an oleaginous base fluid and a phospho-friction reducing agent, wherein the phospho-friction reducing agent is present in an amount of 0.001 v/v % to about 0.5 v/v % of the drilling fluid, wherein the phospho-friction reducing agent comprises at least one selected from the group consisting of amino trimethylene phosphonic acid, methylene diphosphonic acid, trimethylphosphate, dimethyl thiophosphonate, and any combination thereof.

2. The method of claim 1, wherein the drilling fluid further comprises a traditional friction reducing agent.

3. The method of claim 2, wherein the traditional friction reducing agent comprises at least one selected from the group consisting of a $C_2$-$C_{12}$ alcohol, a natural oil, a $C_8$-$C_{24}$ fatty acid ester of a $C_2$-$C_{12}$ polyhydroxylated compound, and any combination thereof.

4. The method of claim 2, wherein the traditional friction reducing agent is present in an amount of 0.01 v/v % to about 5 v/v % of the drilling fluid.

5. The method of claim 1, wherein the wellbore has a bottom hole circulating temperature of about 225° F. to about 400° F.

6. The method of claim 1, wherein the oleaginous fluid comprises at least one selected from the group consisting of an alkane, an olefin, an aromatic organic compound, a cyclic alkane, a paraffin, a diesel fluid, a mineral oil, a desulfurized hydrogenated kerosene, and any combination thereof.

7. The method of claim 1, wherein the phospho-friction reducing agent reduces the coefficient of friction of the drilling fluid.

8. A method comprising:
   drilling at least a portion of a wellbore penetrating a subterranean formation while circulating in the wellbore a drilling fluid comprising an oleaginous base fluid and a phospho-friction reducing agent at about 0.001 v/v % to about 0.5 v/v % of the drilling fluid, wherein the phospho-friction reducing agent comprises at least one selected from the group consisting of amino trimethylene phosphonic acid, methylene diphosphonic acid, trimethylphosphate, dimethyl thiophosphonate, and any combination thereof, and
   wherein the wellbore has a bottom hole circulating temperature of about 225° F. to about 400° F.

9. The method of claim 8, wherein the drilling fluid further comprises a traditional friction reducing agent.

10. The method of claim 9, wherein the traditional friction reducing agent comprises at least one selected from the group consisting of a $C_2$-$C_{12}$ alcohol, a natural oil, a $C_8$-$C_{24}$ fatty acid ester of a $C_2$-$C_{12}$ polyhydroxylated compound, and any combination thereof.

11. The method of claim 9, wherein the traditional friction reducing agent is present in an amount of 0.01 v/v % to about 5 v/v % of the drilling fluid.

12. The method of claim 8, wherein the oleaginous fluid comprises at least one selected from the group consisting of an alkane, an olefin, an aromatic organic compound, a cyclic alkane, a paraffin, a diesel fluid, a mineral oil, a desulfurized hydrogenated kerosene, and any combination thereof.

13. A method comprising:
   drilling at least a portion of a wellbore penetrating a subterranean formation while circulating in the wellbore a drilling fluid comprising an oleaginous base fluid, a phospho-friction reducing agent, and a traditional friction reducing agent, wherein the phospho-friction reducing agent is present in an amount of 0.001 v/v % to about 0.5 v/v % of the drilling fluid and comprises at least one selected from the group consisting of amino trimethylene phosphonic acid, methylene diphosphonic acid, trimethylphosphate, dimethyl thiophosphonate, and any combination thereof, and
   wherein the traditional friction reducing agent comprises at least one selected from the group consisting of a $C_2$-$C_{12}$ alcohol, a natural oil, a $C_8$-$C_{24}$ fatty acid ester of a $C_2$-$C_{12}$ polyhydroxylated compound, and any combination thereof and is present in an amount of 0.01 v/v % to about 5 v/v % of the drilling fluid.

14. The method of claim 13, wherein the wellbore has a bottom hole circulating temperature of about 225° F. to about 400° F.

15. The method of claim 13, wherein the oleaginous fluid comprises at least one selected from the group consisting of an alkane, an olefin, an aromatic organic compound, a cyclic alkane, a paraffin, a diesel fluid, a mineral oil, a desulfurized hydrogenated kerosene, and any combination thereof.

16. A drilling system comprising:
   a drilling platform operably coupled to a drill string;
   a drill bit attached to the distal end of the drill string;
   a drilling fluid comprising an oleaginous base fluid and a phospho-friction reducing agent contained within the drill string, wherein the phospho-friction reducing agent is present in an amount of 0.001 v/v % to about 0.5 v/v % of the drilling fluid, wherein the phospho-friction reducing agent comprises at least one selected from the group consisting of amino trimethylene phosphonic acid, methylene diphosphonic acid, trimethylphosphate, dimethyl thiophosphonate, and any combination thereof; and
   a pump operably connected to the drill string for pumping the drilling fluid through the drill string.

* * * * *